United States Patent [19]

Schmid et al.

[11] Patent Number: 4,619,565
[45] Date of Patent: Oct. 28, 1986

[54] MILLING MACHINE, ESPECIALLY CRANKSHAFT MILLING MACHINE

[75] Inventors: Karlheinz Schmid, Nuertingen-Oberensingen; Heinrich Bonfert, Dettingen, both of Fed. Rep. of Germany

[73] Assignee: Gebrueder Heller, Maschinenfabrik GmbH, Nuertingen, Fed. Rep. of Germany

[21] Appl. No.: 736,231

[22] Filed: May 20, 1985

[30] Foreign Application Priority Data

May 18, 1984 [DE] Fed. Rep. of Germany ....... 3418583

[51] Int. Cl.[4] .............................................. B23C 3/06
[52] U.S. Cl. .................................... 409/135; 409/199; 409/200
[58] Field of Search ............... 409/135, 136, 199, 200, 409/203; 82/9, 20; 29/6; 51/105 SP

[56] References Cited

U.S. PATENT DOCUMENTS 3,236,124 2/1966 Rhoades ......................... 409/136 X
4,326,323 4/1982 Kralowetz et al. ................. 409/200
4,530,626 7/1985 Sabbioni .......................... 409/135 X

FOREIGN PATENT DOCUMENTS 3309722 12/1983 Fed. Rep. of Germany .

OTHER PUBLICATIONS

Werkstatt und Betrieb, 115 (1982) pp. 24 to 26.

Primary Examiner—Z. R. Bilinsky
Attorney, Agent, or Firm—W. G. Fasse; D. H. Kane, Jr.

[57] ABSTRACT

A crankshaft milling or a similar milling machine has been provided with a measuring pick-up which measures heat expansion of the clamping vises and of the milling drums for providing a correction value which is then supplied to the feed advance drives for the respective milling units to compensate for such heat expansions for accurate milling operations.

7 Claims, 5 Drawing Figures

MILLING MACHINE, ESPECIALLY CRANKSHAFT MILLING MACHINE

FIELD OF THE INVENTION

The invention relates to a milling machine, especially a crankshaft milling machine or the like wherein at least one milling unit includes a milling drum carrying a milling cutter and cross carriage means carrying a longitudinal slide member and a cross slide member. Two clamping vises each with its respective work piece clamping chuck are supported by the slide members. One clamping chuck has a lengthwise work piece stop. Feed advance drive means are controlled by a machine control unit including a measuring system for sensing with the aid of length reading devices. carried by the longitudinal slide, position information giving the position of each longitudinal slide member. The measuring system supplies the position information to the machine control unit. For this purpose a length scale is secured in a fixed position alongside the respective longitudinal slide member. The length scale is sensed by the respective length reading device.

DESCRIPTION OF THE PRIOR ART

Crankshaft milling machines of the just mentioned type are described, for example in "Werkstatt und Betrieb" Volume 115, 1982, Number 1, pages 24 to 26. Such crankshaft milling machines have the disadvantage that the dimensions of the indivdiual components of the crankshaft milling machine vary in response to the heat which is generated during the operation of such machines. The heat responsive changes in the longitudinal dimensions are especially aggravating because they lead to crankshafts having too large deviations of the individual, milled crank pins from the thrust bearing or from any other longitudinal measuring reference point. Basically, the same problem occurs in all milling machines of this type, for example, in cam shaft milling machines. However, in cam shaft milling machines the problem is not quite as pronounced as in crankshaft milling machines.

It is known in connection with milling machines which are equipped with cam switches instead of a measuring system for marking the individual longitudinal positions of the milling unit, to compensate the longitudinal dimensional increase of the individual machine components by providing a heatable mounting for the cam switches. This feature was intended to control the longitudinal dimensional increase by adjusting the heater for the cam switch mounting. Such an arrangement cannot be used in a milling machine equipped with a measuring system including a length scale and reading devices or length measuring pick-ups mounted on the cross carriage for sensing the length scale. Additionally, the use of a heatable mounting for the cam switches has the basic disadvantage that the dimensional increase in the longitudinal direction can be ascertained only on the basis of experience values. As a result, in an actual embodiment it is quite possible that substantial deviations occur from the experience values so that it becomes necessary to make control measurements at regular time intervals, especially where narrow work piece tolerance requirements must be met.

German Patent Publication No. 3,309,722 discloses a gear cutting machine in which an indirect measuring is employed for ascertaining the change in the spacing between the tool and the work piece. Such indirect measurement ascertains the spacing variations between the work piece and the tool and causes a compensation of these changes in the spacing which are caused by temperature variations, whereby the measuring result is supplied to the control unit of the machine for causing the required corrections. In this known machine the so-called heat growth is especially effective in or on the machine bed so that the sensing device must ascertain the expansions of the machine bed. Further, such a gear cutting machine comprises only one milling unit. Thus, this prior art also does not provide any suggestions toward these specific problems to be solved according to the invention.

OBJECTS OF THE INVENTION

In view of the foregoing it is the aim of the invention to achieve the following objects singly or in combination:

to assure in a milling machine of the type mentioned above that heat dependent longitudinal growth or increases in the length dimensions of the various machine components are prevented with a substantial degree of certainty from adversely influencing the axial dimensions of critical machined surface areas;

to make sure that even narrow tolerances in the longitudinal dimensions of milled work pieces are maintained with certainty in spite of heat responsive longitudinal growth of machine components; and to measure a longitudinal dimensional change and use the measurement for making the necessary compensation or correction.

SUMMARY OF THE INVENTION

The invention is based on the recognition that the prior art teaching of substantially uniformly heating the machine, with the exception of the machine bed, but including the heating of the cam switch mounting does not do justice to the actual situation. The controlling factor for the measuring system and thus for the machine control is the spacing of the measuring pick-up from the work piece longitudinal stop generally located at the work piece chuck in the left clamping vice, because all axial dimensions are referenced to this work piece longitudinal stop. When there is a length growth, namely an increase of dimensions in the longitudinal direction as a result of a temperature increase in the respective clamping vise, generally the left clamping clamping vise, this spacing is increased. As long as there is only one milling unit, this increase in the spacing is inconsequential for the machining precision as long as it can be assumed that the length growth of the clamping vise and of the milling unit, especially the milling drum, are equal to each other. This condition may very well be satisfied after prolonged periods of time such as several hours of operation of the milling machine. However, with regard to shorter time periods this condition is certainly not satisfied because the clamping vise on the one hand and the milling unit on the other hand, especially the milling drum reach their operational temperature after different operational time periods.

Based on these considerations one can draw the surprising conclusion that in the simplest instance the heat expansion of the clamping vise and thus the excursion of the work piece longitudinal stop relative to the measuring pick-up of the measuring system may be disregarded, and that it is only important to measure the displacement or shift of the milling cutter relative to the longitudinal work piece stop in the clamping vise and to introduce a correction into the machine control in response to this shift.

Conventional crankshaft milling machines are, generally, equipped with two milling units and both milling units as well as the respective clamping vises are customarily arranged mirror-symmetrically relative to each other. Further, both milling units perform substantially identical machining operations so that with regard to the heat-up of these units one can assume identical conditions for both milling units. Thus, the measured displacement or shift of one milling unit could be assumed to be also present at the other milling unit. However, where two milling units are used it is no longer possible to disregard the length growth of the clamping vise. This is so because an axial expansion of the clamping vise with the work piece longitudinal stop displaces the work piece by a respective measure or extent from the zero point of the length measuring scale. Thus, rather than measuring the shift of the milling cutter position relative to the work piece longitudinal stop, it is now necessary to measure the shift of the milling cutter position relative to the measuring pick-up of the measuring system and the axial expansion of the clamping vise. According to the invention it becomes possible to take both of these changes, namely the milling cutter shift and the axial expansion of the clamping vise into account.

A milling machine of the type outlined above is equipped, according to the invention, with a measuring pick-up for measuring spacings between the milling cutter or drum on the one hand and two separate stops. One stop is a rest stop. The other stop is a measurement stop. In the rest position of the respective milling unit, the measuring pickup is urged by spring means to rest with a first detent against the rest stop carried by the longitudinal slide in a cross plane which, for all practical purposes, does not deviate from a cross plane in which a length or position reading device is located. The measuring pick-up carries a second detent which cooperates with the measurement stop which is carried by the clamping chuck. The measurement stop reaches into the path of the second detent or vice versa. The measuring pick-up receives an instruction signal from the machine control unit and measures in response to the instruction signal, the respective spacings and returns corresponding spacing representing signals to the milling machine control unit for providing a compensation for the above mentioned growths in the longitudinal direction.

Due to the identical conditions as both milling units it is possible to use one and the same measuring pick-up for ascertaining the required or interesting measurement values. When the measuring pick-up is in the rest position and thus has a fixed or constant spacing from the reading device, the exact spacing of the milling drum or milling cutter to the reading device can be measured. On the other hand, when the measuring pick-up rests with its second detent against the measurement stop which coincides with the conventional longitudinal work piece stop, the spacing of the milling cutter to this longitudinal work piece stop is measured, whereby the latter measurement provides the required correction for the milling unit which provides the reference point, generally the left-hand milling unit. Both measured values together provide the correction value for the other milling unit, whereby in each instance a comparing takes place with a standard or rated value which normally has reference to the cold status or condition of the milling machine.

Generally, the heating up of the milling machine takes place during a time period which is rather long relative to the time period needed for machining an individual work piece. In other words, the heating up of the machine takes place rather slowly and the final heat-up state is only achieved after a plurality of work pieces have been machined. Thus, it is not necessary, especially in connection with crankshaft milling machines that the compensation measurement according to the invention is performed in connection with the milling of each individual work piece. Rather, it is sufficient to make the compensation measurement after a plurality of work pieces have been machined, for example, after ten such work pieces have been completed. Thus, it is desirable to avoid exposing the stops to stress in the meantime. Accordingly, the measuring stop member should be withdrawable from its operating position. A withdrawable measuring stop can also serve for other purposes.

As mentioned, the position of the rest stop should preferably coincide with the position of the respective length reading device so that an exact reference point is formed. When the two respective cross planes coincide, there is no deviation and hence the absent deviation is constant.

To simplify the adjustment, it is preferable that the measuring pick-up is mounted in or on a carrier member which is made of a material having a thermal expansion coefficient which is as small as possible.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
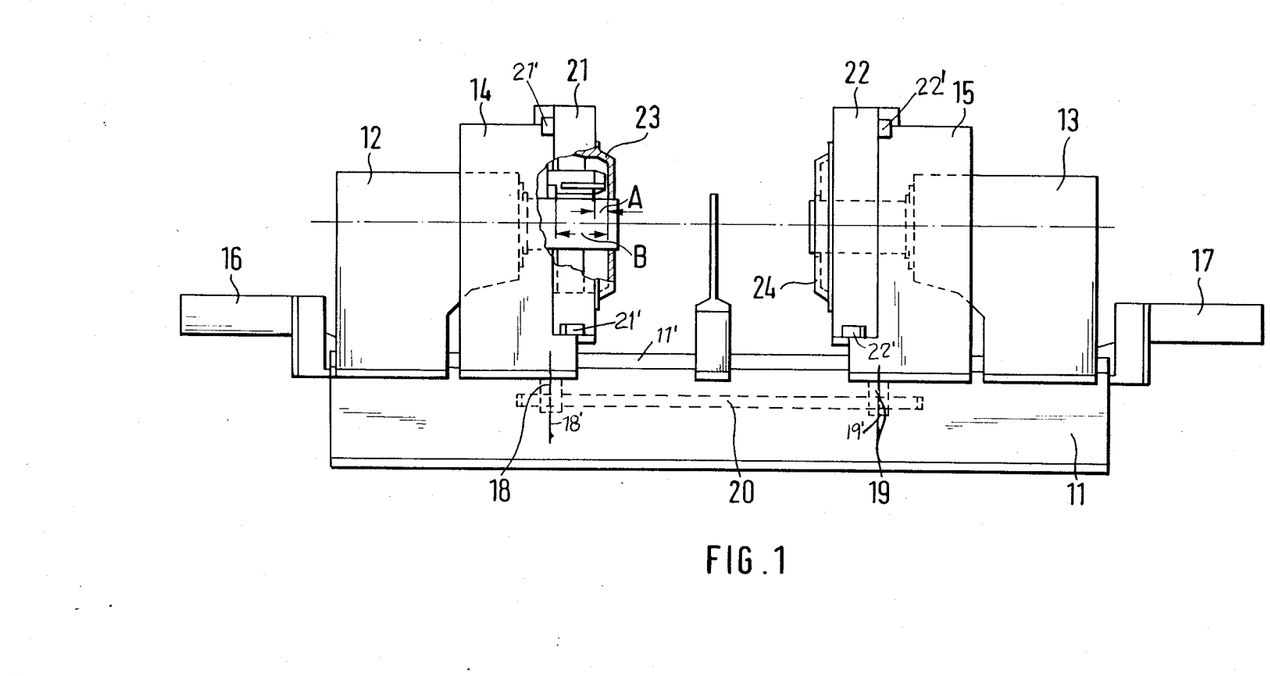
FIG. 1 illustrates schematically a front view, partially in section, of a crankshaft milling machine with two milling units equipped with a compensating measuring system according to the invention.

The milling machine shown in FIG. 1 comprises a machine bed 11 carrying on conventional guide rails 11' a left clamping vise 12 and a right clamping vise 13. The left clamping vise reaches through a left milling unit including a longitudinal slide 14 while the right clamping vise 13 reaches through a right milling unit with a right longitudinal slide 15. The longitudinal slide 14 is driven by longitudinal drive means 16. The right longitudinal slide 15 is driven by longitudinal drive means 17. The longitudinal direction in this connection is defined to extend in parallel to the guides 11' in the plane of FIG. 1.

The longitudinal slide 14 carries a length reading device 18 secured in a fixed position to the longitudinal slide 14. Similarly, the longitudinal slide 15 carries a length reading device 19 also secured in a fixed position to the slide 15. A scale or ruler 20 with length units marked thereon is secured in a fixed position to the machine bed. The reading devices 18 and 19 read the length scale when the slides 14 and 15 are displaced in the longitudinal direction. Suitable reading devices for this purpose are the photoelectric readers supplied by the firm Dr. Johannes Heidenhain GmbH, D-8225 Traunreut, West-Germany, as components of the "Numerische Positionsanzeige Modell Heidenhain 5041" marketed by that firm. The scale or ruler 20 bridges the space between the two milling units, or rather between the two clamping vises 12 and 13. The longitudinal slide 14 carries a cross slide 21 on respective guide members 21'. The longitudinal slide 15 carries a further cross slide 22 on respective guides 22' as is conventional. Thus, the length slide member 14 and the cross slide member 21 together form a cross carriage. Similarly, the length slide 15 and the cross slide 22 together form a second cross carriage. The cross slide 21 carries the milling drum 23 with its respective milling cutter. The cross slide 22 carries the milling drum 24 also with its respective milling cutter. The left-hand milling cutter 26 is schematically shown in FIGS. 2 and 3.

Figure 2:
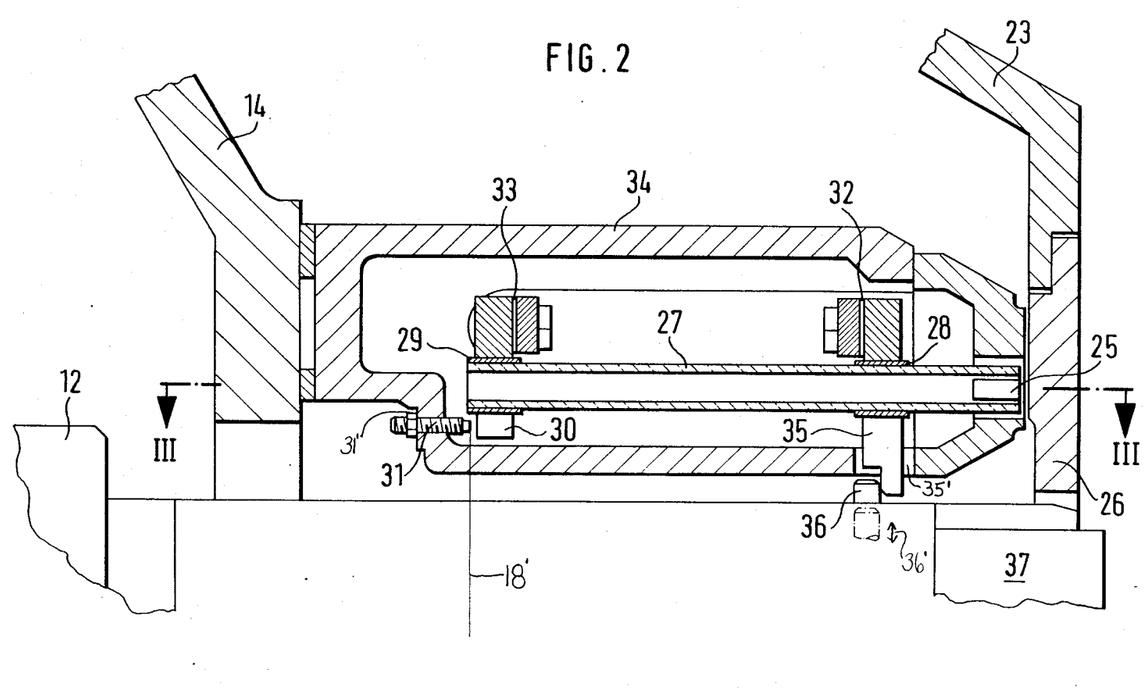
FIG. 2 illustrates on an enlarged scale the sectional view portion of FIG. 1.
Figure 3:
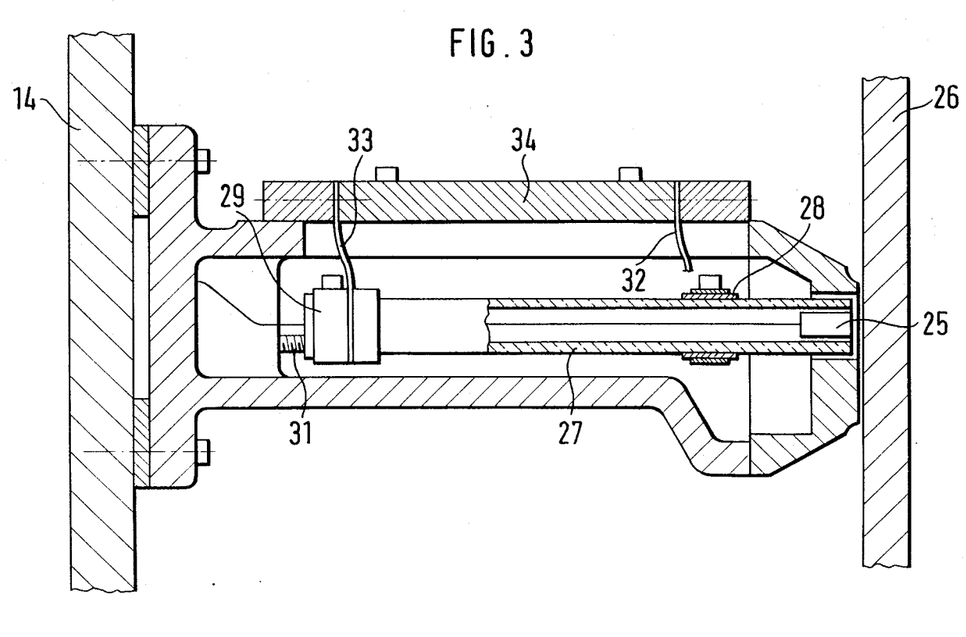
FIG. 3 is a sectional view along section line III—III in FIG. 2.

Referring to FIGS. 2 and 3, they show that the left longitudinal slide 14 carries in a housing 34 a measuring pick-up 25 mounted in or on a pipe 27 so that the pick-up 25 is located as close as possible to the milling drum 23 or rather the milling cutter 26. The pipe 27 is made of a material having a low heat expansion coefficient. A material suitable for this purpose would be "Invar" (RTM) or a similar material. The pipe 27 is mounted by two bushings 28 and 29 secured to the housing 34 through leaf springs 32 and 33. The lefthand bushing 29 carries a detent 30 located for cooperation with a rest stop 31 which is adjustable in its position by a threaded portion cooperating with a nut 31'. The rest stop 31 is preferably so adjustable that its right-hand end, which cooperates with the detent 30, coincides with the cross plane 18' extending at right angles across the longitudinal direction and defining the position of the reading device 18. However, deviations from this preferred adjustment position of the rest stop 31 are not too significant as long as it can be assumed that the deviation itself is constant. The above mentioned springs 32 and 33 also shown in FIG. 3 are so shaped that they bias the pipe 27 in the direction toward the rest stop 31. Thus, in the rest position the detent 30 touches the rest stop 31. The detent 30 and stop 31 form rest stop members.

The bushing 28 closer to the measuring pick-up 25 carries a chuck detent 35 extending downwardly out of the housing 34 through a sufficiently sized opening 35' for cooperation with a measurement stop 36 which is movable up and down between the full line and dash-dotted line positions as indicated by the arrow 36'. Adjustment means for the movement of the measurement stop 36 are known in the art. For example, a piston cylinder could be used. In the rotational position of the clamping chuck 37 carried by the clamping vise 12 the detent 35 contacts the measurement stop 36. In this position of the clamping chuck 37 a work piece may be exchanged. As shown in FIG. 2, due to the contact between the detent 35 and the measurement stop 36, the detent 30 does not contact the rest stop 31. However, when the longitudinal slide 14 is shifted to the right, the detent 35 disengages from the measurement stop 36 and the springs 32 and 33 then urge the detent 30 against the rest stop 31. The detent 35 and the stop 36 form measuring stop elements. The apparatus operates as follows. After a work piece has been milled, the longitudinal slide 14 moves back into the position shown in FIG. 1 which is the loading and unloading position. During this return or withdrawal movement of the slide 14 the measuring pick-up 25 is activated in a known manner and therefore not described in further detail. By using a pipe 27 of a material having a low heat expansion coefficient, as a carrier for the measuring pick-up 25 it is assured that the spacing of the measuring pick-up 25 from the rest stop 31 and thus the longitudinal spacing from the reading device 18 is independent of the temperature and hence it remains sufficiently constant. The heat expansion coefficient of "Invar" (RTM) is, as known, only a fraction of the respective coefficient of iron or steel and thus it may be disregarded. Where still higher precision requirements must be met, it is possible to make the pipe 27 of a material having a still smaller heat expansion coefficient, for example quartz glass would be suitable. In another alternate mounting for the pipe 27 a mounting device could be used as it has become known in connection with so-called compensation pendulums. In any event, the measurements by the pick-up 25 provides, with the respective precision, the instantaneous, actual spacing between the inner surface of the milling cutter 26 and the reading device 18. This spacing is supplied as a respective signal to the machine control unit shown in FIG. 5 to be described in more detail below. The machine control unit compares the measured spacing representing value with a stored rated value and the resulting difference is used as a correction value as will be explained in more detail below with reference to FIG. 4.

Figure 4:
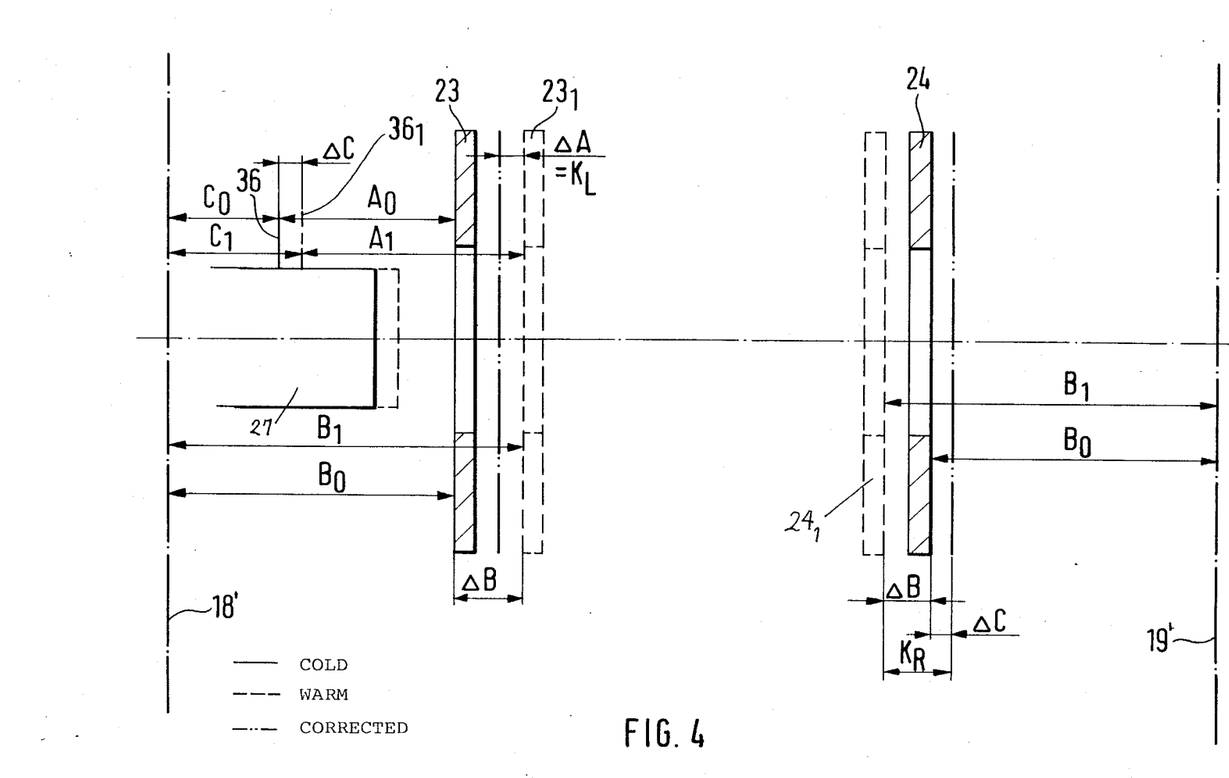
FIG. 4 illustrates schematically the ascertaining of the correction value according to the invention.

After opening the clamping chuck 37, the measurement stop 36 is moved out. This measurement stop 36 is located, as far as it is structurally possible, in a vertical plane coinciding with that plane in which the conventional longitudinal stop for the work piece is located in the clamping chuck 37. Unavoidable deviations, however, can be considered to be sufficiently constant so that it may be assumed, that the detent 35 is adjusted into the plane of the work piece longitudinal stop (not shown) when the detent 35 contacts the measurement stop 36. As mentioned, this time the detent 30 is lifted off the rest stop 31. A renewed activation of the measuring pick-up 25 thus provides a measured value for the instantaneous precise spacing of the inside surface of the milling cutter 26 from the work piece longitudinal stop in the clamping chuck 37. By comparing this value with the rated value stored in the machine control unit, one obtains a change or difference value which is to be used as the correction value for both milling units. The ascertaining of the correction value will now be described with reference to FIG. 4. The vertical plane of the reading devices 18 or 19 is indicated by the respective dash-dotted lined 18' and 19' in FIG. 4. The symbols used of FIG. 4 are explained in the table below, whereby the full line schematic position of the milling drums 23 and 24 represents the cold condition of the machine while the dashed line position $23_1$ represents the warmed up position. The double-dot dashed line indicates the corrected position.

Upon completion of the heat-up it is assumed that the left clamping vise 12 has expanded axially or longitudinally to such an extent that the measurement stop 36 has moved to the dashed line position $36_1$ as shown in FIG. 4. It is further assumed that the milling drum 23 has expanded to an extent so that the milling cutter 36 has assumed the dashed line position $23_1$ and $24_1$. Instead of the cold distance $B_0$ now the larger distance $B_1$ is being measured. Further, instead of the cold distance $A_0$ between the stop 36 and the milling drum 23, now the distance $A_1$ is being measured. As explained above, only the relative change of the longitudinal position of the milling cutter relative to the measurement stop 36 is important for the milling accuracy. Thus, the correction value $K_L$ for the left milling unit requires only that the difference between $A_0-A_1$ is taken into account. In the illustrated example this difference is negative because $A_1$ is larger than $A_0$ if we assume, as is customary, that the positive feed advance direction is from the left to the right. Thus, the left correction value $K_L$ is equal to $A_0-A_1$. After applying this correction value the left-hand milling cutter 23 assumes a position indicated symbolically by the double-dot-dashed line in the left-hand part of FIG. 4. This position corresponds to the rated value for the milling cutter position relative to the measurement stop 36.

For the right-hand milling unit the values $B_0$ and $B_1$ need to be taken into account for the correction as mentioned. However, additionally, the axial displacement of the measurement stop 36 needs to be taken into account. This axial displacement results in a corresponding displacement of the work piece. Thus, the correction value for the right-hand unit $K_R$ is calculated by taking into account $\Delta B = B_1 - B_0$ and $\Delta C = C_1 - C_0$, whereby $\Delta C$ has the same sign, $+$ or $-$, as $\Delta A$, if that is calculated $\Delta A = A_0 - A_1$, in the same manner as $K_L$. FIG. 4 shows that $B_1 = A_1 + C_1$ and that $B_0 = A_0 + C_0$, hence $B_1 - B_0 = A_1 - A_0 + C_1 - C_0$ or $\Delta B = \Delta C - \Delta A$, and thus $\Delta C = \Delta A + \Delta B$. Thus, the C value can be calculated by measuring the A and B values and it is not necessary to measure C separately. By insertion we obtain $K_R = \Delta B + \Delta C = 2\Delta B + \Delta A$. Once these correction values have been supplied into the control unit and after the control unit has made the respective corrections, the right-hand milling unit in FIG. 4 will take up the doubledot-dashed line. This longitudinal position corresponds to the desired rated value relative to the measuring stop 36.

The correction values may be easily ascertained in the machine control unit by using simple signal comparing circuits connected to the measuring pick-up 25 and to a memory in which cold values or equivalent standard values are stored.

Figure 5:
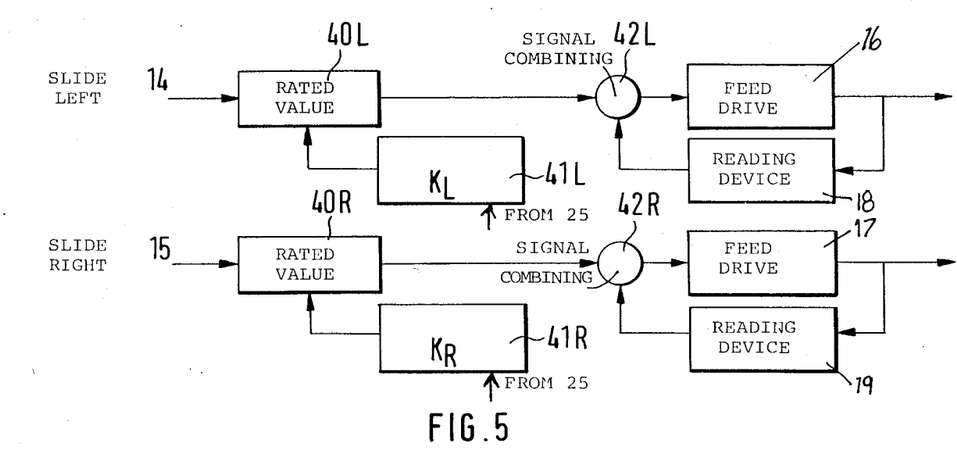
FIG. 5 is a block circuit diagram of the machine control unit as far as it is relevant to the invention for use in a milling machine according to FIG. 1.

FIG. 5 shows a possibility of using the correction values. The machine control unit or a machining program provides the rated values for the left milling unit and for the right milling unit. These rated values are stored in a rated value memory 40L and 40R. A second input of each rated value memory is connected to a respective correction circuit 41L and 41R. These correction circuits are conventional signal comparing circuit in which the instantaneous measured value as measured by the measuring pick-up 25 is compared with the corresponding cold reference value. In the preferred embodiment each signal comparing circuit 41L and 41R is a microprocessor circuit. Such microprocessor circuit includes a memory in which the cold or reference values are stored by storing the instantaneous measured values at the time the machine begins to work. These stored values are later compared, in conventional comparison means commonly known as ALU (Arithmetic and Logical Unit), with the then obtained instantaneous measured values, to produce, as discussed above with reference to FIG. 4, the required correction value which is then combined with the respective rated value in memory 40L and 40R, respectively. The combination product (in the preferred embodiment, the sum of the rated value stored in memory 40L and 40R, respectively, and the correction value) is then applied, as a corrected rate value, to a further signal comparing circuit 42L and 42R, respectively, in which the actual position information from the conventional measurement system, ascertained by the two reading devices 18 and 19, respectively, are compared with the corrected rated values. At the output of the comparing circuits 42L and 42R a respective error signal is derived which is employed as a respective control signal for the left and right feed advance drives 16 and 17, respectively.

It is possible to employ the correction values in different ways, for example, the reading devices 18, 19 can be displaced physically or virtually, whereby it might be necessary to agree upon different signs ($+$ or $-$). In another alternative, the correction value can be inserted into the measuring system. However, the described correction of the rated value in a rated value memory has been found to be rather practical.

Although the invention has been described with reference to specific example embodiments, it will be appreciated, that it is intended to cover all modifications and equivalents within the scope of the appended claims.

TABLE $A_0$ = spacing between inner surface of cold milling drum or cutter (23) from cold measurement stop (36);
$A_1$ = spacing between warm milling drum or cutter and warm measurement stop ($36_1$);
$B_0$ = spacing between inner surface of cold milling drum or cutter and plane (18' or 19') defining position of reading device (18, 19);
$B_1$ = spacing between warm milling drum or cutter and plane (18' or 19');
$C_0$ = spacing between cold measurement stop (36) and plane (18');
$C_1$ = spacing between warm measurement stop (36) and plane (18');
$\Delta A$ = distance between warm and corrected position;
$\Delta B$ = distance between cold and warm position;
$\Delta C$ = distance between cold and warm position of measurement stop (36, $36_1$);
$K_L$ = left correction value;
$K_R$ = right correction value.

Incidentally, the measuring pick-up 25 is preferably a contactless sensor, such as Type WSG 69 of the firm Dr. Reutlinger & Soehne GmbH, D-6100 Darmstadt, West-Germany.

What we claim is:

1. A milling machine comprising a left milling unit and a right milling unit with respective milling cutter means supported on a machine bed, and including at least a longitudinal slide on or in each milling unit, drive means for displacing the respective longitudinal slide in a longitudinal direction along said machine bed, clamping means on said machine bed, each milling unit comprising a respective length reading device for reading length values from a length scale secured in a fixed position to said machine, said milling machine comprising a single measuring pick-up means (25) carried by one of said longitudinal slides (14) in a position for measuring spacings relevant to both of said milling units, rest stop means including cooperating members (30, 31)

arranged in a position for defining a substantially constant rest position of said measuring pick-up means (25) and measuring stop means including cooperating elements (35, 36) for defining a measuring position of said measuring pick-up means (25), one element (35) being carried by said one longitudinal slide (14), the other element being carried by the respective clamping means, spring means (32, 33) mounting said measuring pick-up means (25) to said one longitudinal slide for urging said stop members (30, 31) into cooperation in the rest position of said one longitudinal slide (14), said measuring pick-up means (25) being responsive to an instruction signal from a machine control unit for measuring a spacing between said milling cutter means (26) and both of said stop means and for providing a respective correction signal component to said machine control unit, said control unit providing a correction value for both milling units from said single measuring pick-up means.

2. The machine of claim 1, wherein said measuring stop means have a fixed position relative to a longitudinal work piece stop.

3. The machine of claim 1, wherein said rest stop means are located in a first plane extending across a longitudinal direction of said machine bed, said first plane coinciding with a second plane in which the respective one of said length reading devices is located.

4. The machine of claim 1, wherein said measuring pick-up means comprise a contactless pick-up member for measuring said spacings.

5. The machine of claim 1, further comprising means movably supporting at least one of said measuring stop elements (35, 36) on said clamping means and on said measuring pick-up means, for moving the respective stop element into the path of the respective other stop element.

6. The machine of claim 1, wherein said rest stop member (31) on the longitudinal slide (14) is arranged with its end in a cross plane in which said reading device (18) for reading of said length scale means is located.

7. The machine of claim 1, wherein said measuring pick-up means (25) is mounted on a carrier member (27) made of a material having a small thermal expansion coefficient such as "Invar" (RTM).

* * * * *